United States Patent Office 3,559,422
Patented Feb. 2, 1971

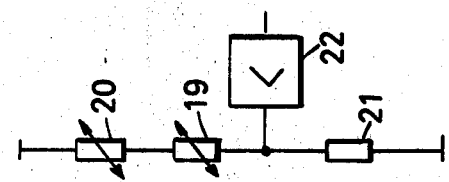
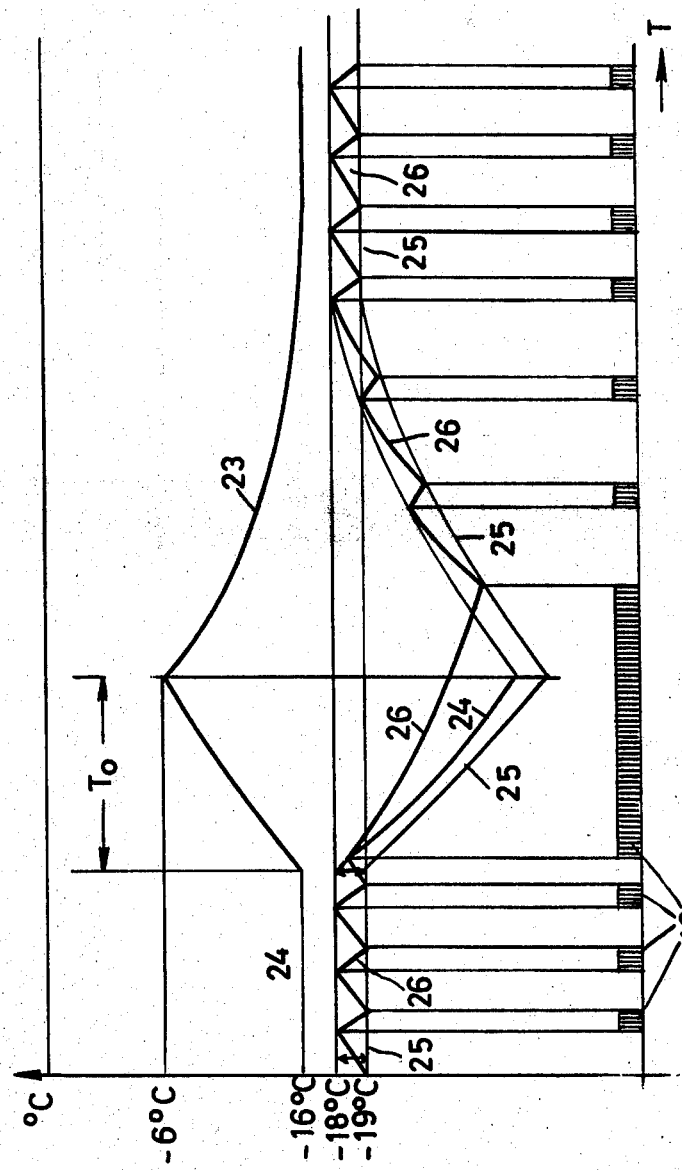

3,559,422
MEANS FOR REGULATING THE TEMPERATURE OF REFRIGERATORS
Walter Holzer, Meersburg (Bodensee), Germany, assignor to Holzer Patent AG, Zug. Switzerland
Original application Oct. 25, 1967, Ser. No. 678,010. Divided and this application Dec. 9, 1968, Ser. No. 782,134
Int. Cl. F25b 41/00
U.S. Cl. 62—209
8 Claims

ABSTRACT OF THE DISCLOSURE

This invention relates to a system for regulating the temperature of refrigerating equipment and has for one of its objectives frost control. This is achieved because the cold output is here regulated by an electronic analogue value control according to a variable temperature setting, a continuously measured actual temperature and a measurement value which is an analogue of the amount of cold produced. Constant temperature is also maintained when the refrigerator door is opened by automatically shifting the response value of temperature control to a temperature value that is substantially lower than normal operation.

CROSS REFERENCES

This application is a division of United States application 678,010 filed Oct. 25, 1967 now Pat. No. 3,491,546 on which priority is claimed.

BACKGROUND

The invention relates to a system for regulating the temperature of refrigerating equipment, and in particular to the regulation of refrigerators, deep freezers and cold rooms.

Refrigerators have hitherto made almost exclusive use of thermostats, which switch the refrigerator on at a given temperature and switch the refrigerating unit off again once another given temperature has been reached. The sensor is usually installed in the cooling space in a position where it can record mean temperature values and frequently where it has particularly critical conditions for temperature measurement.

For an adequate supply of cold, the difference between the switch-on and switch-off temperatures must not be too small. It is a particularly unfavorable fact that the time constant of the equipment between the refrigerating process and the thermostat response produces very large temperature differences in the cooling space, because the refrigerating unit goes on working at full output until the requisite temperature has been reached at the thermostat measuring point.

Since, with normal refrigerators, a temperature of about +2° C. to +10° C., in the cooling space can be preset, the temperature at the evaporator often lies at −10° C. to −20° C. or even below. This accounts for the familiar icing up of the evaporator, since the atmospheric moisture condensed on it freezes, with the well-known undesirable results. A special defrosting procedure is required to keep the cooling system in working order.

With refrigerating equipment of the kind mentioned, such as used hitherto, the refrigerating unit is switched on and off by a thermostat that measures the temperature directly from the evaporator or at least from its immediate vicinity. This certainly gives sufficient accuracy for practical requirements, since the unit, in the temperature range between −18° C. and −19° C., regulates the evaporator temperature, so that this refrigeration temperature is kept stable, but at the same time it should not be overlooked that the drawback of such regulation lies primarily in the fact that when the door or lid is opened for the insertion of goods for cooling, the subsequent lowering of the inside temperature takes place somewhat slowly, since it is only the temperature drop that acts as the magnitude affecting the control circuit. This temperature drop is given by the difference between the temperature prevailing as a result of the opening of the door or lid and the upper response value of −18° C. of the control circuit.

SUMMARY

The purpose of the invention is to provide a refrigerator in which no special measures are necessary for defrosting the equipment. This purpose it achieves because the cold output is here regulated by an electronic analogue value control according to a variable temperature setting, a continuously measured actual temperature and a measurement value which is an analogue of the amount of cold produced.

Another purpose of the invention is, with a refrigerator of this kind, to maintain as constant a temperature as possible in the cooling space or evaporator space, even after the opening of the door or lid. This further purpose is achieved by virtue of the fact that, when the door or lid of the room or cabinet is opened, the response value of the temperature control is automatically shifted to a temperature value that is lower as compared to steady operation.

Achievement of the first purpose mentioned is made possible by continuously regulated operation of the refrigerating unit. For this purpose, it is possible to control not only the pressure in the condensation system, but also (especially in compression refrigerator equipment) the rotation speed of the compressor.

DESCRIPTION OF DRAWINGS

The accompanying drawings show one practical example of the object of the invention wherein:

Both of these drawings relate to achievement of the first purpose of the invention, while the succeeding drawings, FIGS. 3 to 5, show a solution of the second problem.

FIG. 3 shows a deep-freeze cabinet diagrammatically in section.

FIG. 4 shows the temperature sensor circuit.

FIG. 5 is a diagram of time-temperature relations.

PREFERRED EMBODIMENTS

Figure 1:
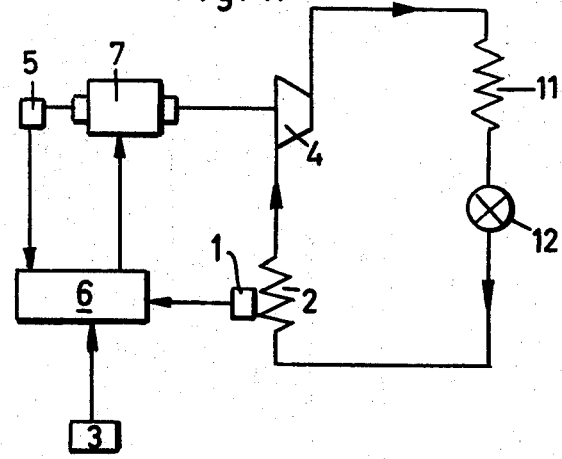
FIG. 1 shows an arrangement with the compressor motor subject to speed regulation.

In the design shown in FIG. 1, compressor 4 is driven by motor 7 and discharges cooling liquid into condenser 11 through valve 12 and evaporator 2. The coolant returns from evaporator 2 to compressor 4 to start another cycle. Speed gauge (tachometer) 5 measures the rotation speed of motor 7 and converts it into an electronic analogue value which is transmitted to electronic control 6 by way of a connecting lead. The rotation speed of motor 7 represents a measure of the coolant pumped through evaporator 2. The cooling temperature of evaporator 2 is measured by a sensor 1 and is converted simultaneously into an electronic analogue value, which is fed to electronic control 6 through a connecting lead. The electronic analogue value may very well be an electric resistor, a voltage or an amperage. The desired temperature is set at temperature controller 3 by means of an electric analogue value such as a resistor. The electric analogue values of speed gauge 5 of sensor 1 and of temperature controller 3 are compared with each other by electronic controller 6. According to the results of this comparison, the rotation speed of motor 7 will be raised, lowered or maintained by way of the connecting lead between electronic controller 6 and motor 7. An increase in rotation speed of motor 7 produces an increase in cooling capacity, i.e. in coolant flow to evaporator 2. A decrease in rotation speed of motor 7 produces a decrease in coolant flow to evaporator 2.

Figure 2:
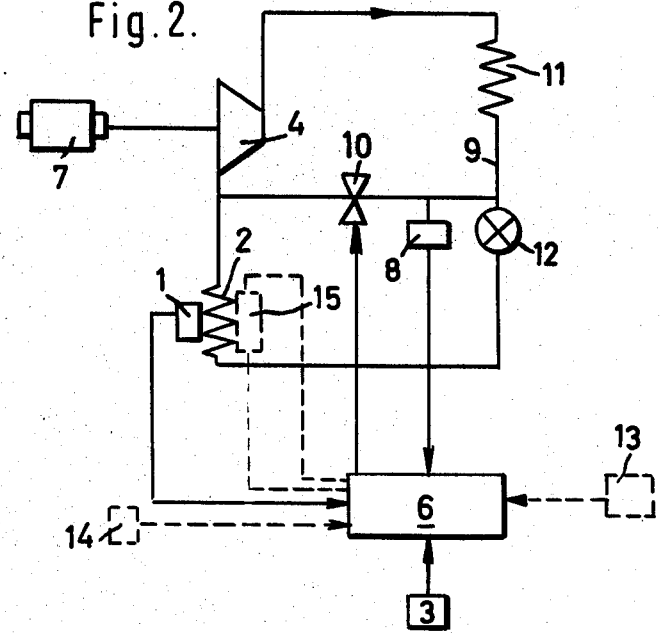
FIG. 2 is a diagram of an arrangement whereby the pressure in the evaporator system is varied.

In the design of FIG. 2, motor 7 runs independently of electronic controller 6 with a constant rotation speed and drives a constant quantity through condenser 11. The quantity of coolant which flows through evaporator 2 is regulated by by-pass valve 10. By-pass valve 10 and pressure gauge 8 regulate the coolant quantity required for evaporator 2. Pressure gauge 8 measures compression of coolant within the by-pass line and feeds it to electronic controller 6. If a comparison of these electronic analogue values results in a definite differential value, electronic controller 6 will send a regulating signal to by-pass valve 10 in accordance with the amount of the differential. This regulating signal adjusts by-pass valve 10 and according to requirements alters flow through by-pass valve 10 and also the supply of coolant to evaporator 2. In addition to sensor 1, FIG. 2 calls for a second temperature sensor 14 which measures the cooling space temperature and causes an electronic analogue value corresponding to the measurement. The last-mentioned electronic analogue value is also transmitted to electronic controller 6. The coolant quantity requirement can be regulated either in relation to the temperature measured by sensor 1 or in relation to the temperature measured by sensor 14.

Particularly favorable conditions are obtained when temperature measuring sensor 1 is placed directly at evaporator 2 (FIG. 1). By direct control aimed at a steady temperature, the surface of the evaporator can be kept, for example, at a constant $+2°$ C. This, moreover, completely excludes icing-up, because evaporator 2 is never chilled below freezing. Withdrawn cold is immediately taken under control to evaporator 2. The temperature sensor can even be fitted outside of evaporator 2, the walls of which are good heat conductors. This may produce further advantages, because all control components are positioned outside of the cooling space.

For analogue value regulation, use is made (for example) of a temperature-sensitive electrical resistor (thermistor), which is situated within the temperature sensor 1 and gives rise to an analogue voltage $U_T$ equivalent to the measured temperature on a voltage divider. This voltage is compared with a desired-value voltage $U_S$, which is set by hand by means of controller 3 analogous to the temperature desired in the refrigerator cabinet. The difference between the two voltages $U_S-U_T$ serves as the control magnitude for the cold output to be supplied in temperature sensor 1 there is therefore present a series connection of a resistor with a thermistor. This series connection is under voltage. The voltage drop at the thermistor corresponds in this connection to $U_T$.

Compressor 4, the speed of rotation of which is controlled, has a speed gauge (tachometer) 5 which provides the actual electronic control 6 with a reference voltage $U_N$, which is an analogue of the speed of rotation N. It is immaterial whether this tachometer voltage be directly generated or derived indirectly from the frequency. The electronic control 6 is accordingly affected by temperature sensor 1, tachometer 5 and controller 3. Accordingly, in these three inputs there are voltages which correspond to these three values. Controller 3, which contains a conventional circuit for comparison between the desired value and the actual value, compares the voltage of sensor 1, $U_T$, with the voltage of controller 3, $U_S$, and forms the difference between them. Speed gauge 5 indicates a comparison voltage, $U_N$. Motor 7 is adjusted in accordance with whether $U_N$ is lesser or greater than $U_S-U_T$.

For each voltage difference $U_S-U_T$, there is a corresponding correct compressor speed, the value of which is based on experience. As a practical example, the following might be chosen:

EXAMPLE 1

For $U_S-U_T=0$, that is to say upon the desired temperature being reached, the compressor should run at only 50% of the full speed, giving rather less than the amount of cold which arises in any case as a loss.

EXAMPLE 2

For $U_S-U_T=1$ volt; however, the compressor should be giving 100% of the full amount of cold, the thermistor with its voltage divider being so arranged that $U_S-U_T=1$ volt arises even for a temperature rise of 1 deg. C. In other words, even a temperature of 1 deg. C. should result in regulating the compressor speed from 50% to 100%.

In accordance with this example, the tachometer reference voltage $U_N$ should be so arranged that the voltage $U_N$ rises by 1 volt when there is a speed rise from 50% to 100%.

Actual speed regulation is brought about by (for example) full power being fed to motor 7 of compressor 4 for so long as $U_N$ is smaller than $U_S-U_T$. The cooling process begins. As soon as $U_S-U_T$ reaches 1 volt, as in the example, so that it corresponds to the value of $U_N$ for 100% speed, the actual regulation process starts. As soon as $U_S-U_T$ falls below the value $U_N$, the current feed to the motor 7 is temporarily cut, so that the speed and hence $U_N$ falls, until $U_N$ is smaller than $U_S-U_T$. The compressor motor is then switched on again in the conventional manner in a control circuit, either at a lower speed than corresponds to $U_S-U_T$ or by time control after a brief interval. The speed thus increases, full power being supplied once more to the motor in consequence of the condition $U_N<U_S-U_T$, until $U_N$ reaches the value of $U_S-U_T$, which again results in temporarily cutting off the current supply from the motor, and so forth.

As long as the cold output produced is greater than the cold losses and/or cold consumption, $U_S-U_T$ will continue to fall and the alternation of continual reduction of the compressor speed or of $U_N$ will proceed until a further temperature drop no longer occurs. According to this example, the desired temperature setting is achieved with a maximum deviation of 1 deg. C. The maximum deviation of 1 deg. C. results from the fact that a rise in temperature of 1 deg. C. should cover the full range of regulation from 50% to 100%.

For design of the analogue value regulation in accordance with the invention, it is immaterial which range of speeds (even as far as "nil" cold output) or which temperature tolerances be chosen, because these values are determined to a large extent by the refrigerator cabinet itself and by the various components. Nor does it matter what kind of electronic speed regulation be employed, so long as the alternation of tachometer voltage $U_N$ and temperature difference voltage $U_S-U_T$ is maintained.

Similar considerations apply to regulation of the cold output over the compression and/or condensation range. FIG. 2 may serve as a practical example. Instead of the tachometer 5 a pressure gauge 8 is provided in the compressor part 9 which, according to the compression pressure, supplies an analogue voltage $U_N$ to the control for comparison with $U_S-U_T$. This time, however, the control acts not on motor 5 of compressor 4, but (for instance) on a by-pass valve 10 which reduces the compression and hence the cold output until the state of equilibrium is reached in which $U_N=U_S-U_T$. As shown in FIG. 2, by-pass valve 10 is located in a by-pass line which connects condenser 11 directly with the inlet line of compressor 4. The purpose of by-pass valve 10 is to increase or decrease the flow of coolant through evaporator 2. Between by-pass valve 10 and electronic control 6 is an electric lead which regulates by-pass valve 10; therefore, by-pass valve 10 must be an electromagnetic actuated or controlled valve. By-pass valve 10 may be impulse-controlled with the number and duration of the impulses being controlled by regulator 6 in terms of $U_N$ or a combination of $U_N$ and time. Numerous control circuits exist for this purpose.

In FIGS. 1 and 2, corresponding parts are numbered alike. In addition to the parts already mentioned, condenser 11 and reducing valve 12 are shown in the drawings. In putting the invention into practice, it is desirable to provide, in addition to the evaporator, which is temperature-controlled above freezing, at least one further evaporator for a lower temperature range, to serve for the production of ice cubes or deep freezing.

Another use for analogue value regulation, in the case of refrigerators operating within the frost zone in the customary way, with a sensor fitted in the cooling space, is to set the desired temperature under time control once every 24 hours, or so, to a setting a few degrees above freezing, with a second sensor taking the temperature directly from the evaporator. This arrangement insures that, despite the defrosting procedure, the cooling space temperature will not rise above a value that presents a threat to the goods being refrigerated. This method of defrosting can be combined with any of the usual heating processes employing (for example) electricity or hot gas.

In FIG. 2, the basic elements required when defrosting is applied are indicated in broken line. Time switch (clock) 13 controls the timing of the defrosting process by a changeover to a higher temperature setting, changing over from the cooling-space temperature sensor 14 to the temperature sensor 1 on the evaporator. At the same time, for example, an electric heater 15 can also be switched in. Heater 15 here may be regulated in the same way as the motor speed, by controlled continually intermittent power impulses. Time switch 13 can be a normal commercial electric timer which operates at intervals of 24 hours or at any other desired time interval. Time switch 13 sends its signal to electronic control 6 which in turn activates heater 15 for the duration of a given timer setting. The heating devices here contemplated are widely known and may comprise for example an electric resistor mounted nearby evaporator 2 to heat the evaporator in such a manner that surface ice defrosts.

The advantage to be gained from the indicated solution to the second problem envisaged is clear, because by lowering the response value the regulator is given a very high disturbance value which results in a correspondingly rapid and intense reaction so that conditions of fixed working can be attained within a relatively short space of time. One advantageous factor is that a small rise in temperature in relation to the desired value in the interior of the cabinet or the like results in lowering the evaporator temperature by several times the temperature rise so that the interior of the cabinet is cooled very rapidly.

Figure 3:
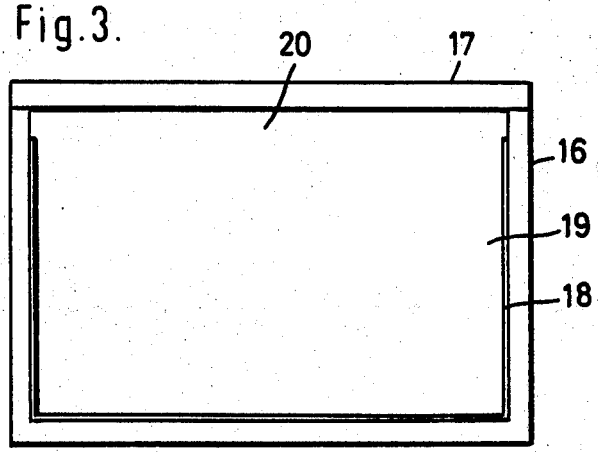
Figure 7:
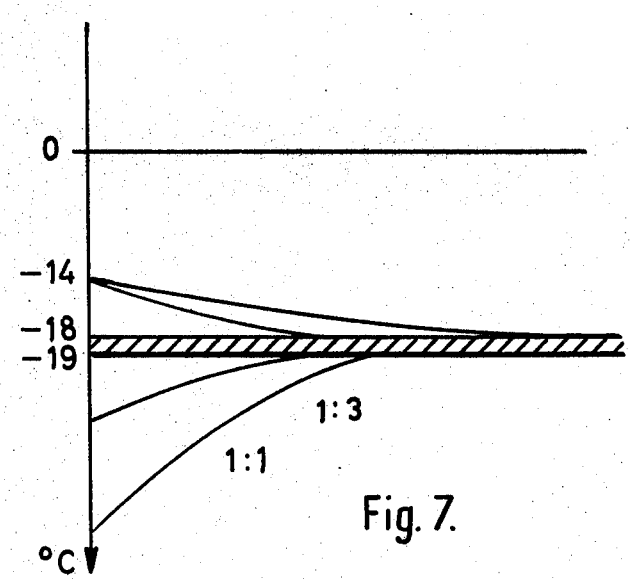
FIG. 7 is another diagram of time-temperature relations.
Figure 6:
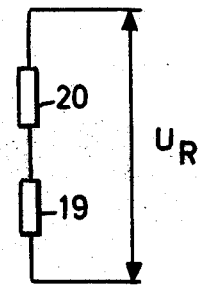
FIG. 6 shows an arrangement of temperature sensors.

As described hereunder with reference to FIGS. 3 to 5, the sensors employed may with advantage take the form of temperature-sensitive resistor elements, these sensors having different tmperature coefficients and the temperature coefficient of the sensor that measures the interior temperature being higher than that of the sensor that measures the evaporator temperature, so that in this way ready adaptation over a wide range to the conditions present at any given moment is possible by simple means and regulation can be carried out very accurately with an electronic thermostat.

Experience has shown a temperature coefficient ratio of about 1:3 to be suitable, that is to say that the temperature coefficient of the sensor of the interior tempreature is about three times as high as that of the sensor at the evaporator, so that a trifling temperature change of approximately 4 deg. C. within the deep-freeze brings about three times as great a temperature change at the evaporator, so as to balance the change in the response value once more. If, for example, the lid of a deep-freeze cabinet be opened to enable goods to be put therein, warm air enters the cabinet and raises the interior temperature by about 4 deg. C. If the temperature coefficients of the sensor resistors stand in the ratio of 1:3, the response threshold of −18° C. is dropped 12 degrees C. i.e. to −30° C. Obviously, such a drop in response value, from −18° C. to −30° C., results in far quicker cooling of the goods put in than if the regulation system were operated at a constant response level of −18° C.

The deep-freeze cabinet (shown in FIG. 3) conventionally consists of a box-like basic body, 16, closed at the top by a lid 17. In the vicinity of the inner wall of body 16 lies evaporator 18. A measuring sensor at 19 measures the temperature of the evaporator or of its immediate vicinity. A measurement sensor at 20 measures the temperature within the actual cooling space. As shown by FIG. 4 in the form of a block circuit diagram, both measuring sensors 19 and 20, which take the form of temperature-sensitive ohmic resistances, are joined in series with the measuring resistor 21 as a voltage divider and form the input of a threshold-value amplifier 22. Amplifier 22 switches the refrigerating unit (not shown, being familiar enough) off and on, according to the measurement values given by the sensors 19 and 20. This threshold-value amplifier 22 has an adjustable switching threshold (switching spindle), and when the upper switching threshold vlaue is reached (in the present example at −18° C.) the compressor is switched on and when the lower switching threshold value is reached (−19° C.) the compressor is switched off.

FIG. 5 shows in diagram form the mode of operation of the equipment, the abscissae representing time T and the ordinates the temperature in deg. C. The line 23 shows the temperature variation within the actual cooling space, the temperature of which is measured by the sensor 20. During the period $T_0$, the lid of the refrigerator cabinet has been opened. The lines 24 and 25 represent the upper and lower switching threshold temperatures (−18° C. and −19° C.), at which the compressor is switched off and on. Between the two lines 24 and 25 runs the temperature curve 26 of the evaporator, the temperature of which is measured by the measuring sensor 19. The time intervals during which the compressor is in operation are shown by 27. In the left-hand portion of the diagram, steady working of the refrigerator cabinet is represented. The interior temperature (line 23), which is measured by sensor 20, is practically constant, this being achieved by the repeated switching on and off of the compressor. The actual evaporator temperature 26 varies at the same time between the two regulation limit values of −18° C. and −19° C. If, now, the lid of the cabinet be opened (period $T_0$), warm air enters the interior and the temperature 23 measured by sensor 20 rises. This, however, causes the switch-on and switch-off threshold of the threshold-value amplifier to be lowered. Thus, if the cooling at the evaporator, as shown in the curve 26, cannot follow the rapid fall in the line 24, the refrigerating unit will remain switched on until the temperature line 26 of the evaporator subsequently cuts across the lower switch-off threshold. Not until then does the switching on and off between the two control temperatures of −18° C. and −19° C. recommence, as a result of the lowering of the evaporator temperature, the desired rapid cooling is achieved. The particular advantage of this arrangement lies, however, not only in the fact that the chilling of freshly introduced goods is rapid, but also in the fact that a very close and precise control tolerance is nevertheless ensured in the steady condition. In other words, in the steady condition, the switching offers the advantage of great accuracy with close tolerances and in the event of disturbance, when the lid is opened a marked drop in temperature and hence very rapid cooling are ensured.

Obviously the method described in the foregoing and the equipment for applying that method can be used advantageously not only for deep freezers, but also for refrigerating equipment of all kinds, such as cold rooms or refrigerator cabinets.

What I claim is:

1. In a refrigerator with a refrigerator space and an electric-motor-driven compressor operatively connected to circulate a suitable coolant in series through a condenser, a reducing valve and an evaporator, a system for regulating the temperature of the refrigerator space by controlling the coolant and comprising in combination:

means for measuring continuously actual temperature of the refrigerator space and for converting said measurement into an electronic analogue actual-temperature signal, means for setting an electronic analogue nominal-temperature signal, means for measuring instantaneous flow of the coolant and for converting said measurement into an electronic analogue flow signal, means for comparing said actual-temperature signal with said nominal-temperature signal to yield a differential signal, sensing means for comparing said differential signal with said flow signal, said sensing means connected to means for controlling delivery of said coolant to the evaporator.

2. The system of claim 1 with said means for measuring instantaneous flow rate of said coolant responsive to speed of rotation of said compressor.

3. The system of claim 1 with said means for measuring instantaneous flow rate of said coolant responsive to pressure in a compression part of the refrigerator.

4. The system of claim 1 with said means for measuring instantaneous flow rate of the coolant responsive to pressure in said condenser.

5. The system of claim 1 with said means for measuring continuously actual temperature of the refrigerator space responsive to actual temperature at said evaporator.

6. In a refrigerator with a refrigerator space and a door communicating therewith, a refrigerating unit operatively connected to cool said refrigerator space, a system for controlling the refrigerating unit to reduce effort of the refrigerating unit and to regulate temperature of the refrigerator space when said door is opened and comprising in combination:

means for presetting a signal, cooling means responsive to opening of said door for lowering said signal substantially below its presetting.

7. The system of claim 6 with said means responsive to opening of said door more particularly responsive to temperature in said refrigerator space, means for making the signal responsive to temperature, means for magnifying changes in temperature of said refrigerator space to magnify said cooling means.

8. In a refrigerator with a refrigerator space and an electric-motor-driven compressor operatively connected to circulate a suitable coolant in series through a condenser a reducing valve and an evaporator, a system for regulating temperature of the refrigerator space by controlling delivery of coolant to said evaporator and comprising in combination:

a pair of temperature means each for measuring continuously actual temperature at two separate locations of the refrigerator space, each of the temperature means including a temperature-sensitive ohmic resistor, said ohmic resistors joined in series with a measuring resistor as a voltage divider and forming input for a threshold-value amplifier, control means responsive to said threshold-value amplifier for controlling the supply of coolant to the evaporator.

References Cited

UNITED STATES PATENTS

| | | | |
|---|---|---|---|
| 3,010,289 | 11/1961 | Kuklinski | 62—215 |
| 3,171,264 | 3/1965 | Griffin | 62—209 |
| 3,214,931 | 11/1965 | Petrzuek | 62—228 |
| 3,324,672 | 6/1967 | Sones | 62—209 |
| 3,355,906 | 12/1967 | Newton | 62—228 |

MEYER PERLIN, Primary Examiner

U.S. Cl. X.R.

62—215, 228